TELEVISION RECEIVER TEST EQUIPMENT OR THE LIKE

Filed Sept. 25, 1956 2 Sheets-Sheet 1

DWIGHT S. LORD
INVENTOR.
BY Bruce L. Birchard
HIS ATTORNEY

Dec. 30, 1958 D. S. LORD 2,866,897

TELEVISION RECEIVER TEST EQUIPMENT OR THE LIKE

Filed Sept. 25, 1956 2 Sheets-Sheet 2

DWIGHT S. LORD
*INVENTOR.*

BY [signature]

HIS ATTORNEY

United States Patent Office 2,866,897

Patented Dec. 30, 1958

2,866,897

TELEVISION RECEIVER TEST EQUIPMENT OR THE LIKE

Dwight S. Lord, Covina, Calif., assignor to Hoffman Electronics Corporation, a corporation of California Application September 25, 1956, Serial No. 611,966

16 Claims. (Cl. 250—36)

This invention is related to television receiver test equipment in general, and more particularly to a new and useful type of television receiver test equipment falling in the general category of dot generators.

The dot generator as is currently known and used by those skilled in the television art is a unit of electronic test equipment which is employed either by the television receiver manufacturer or by television receiver service men for electrically aligning television receivers and their associated television picture tubes. This particular unit of test equipment is concerned principally with the alignment of color television receivers employing conventional three-gun color picture tubes. The dot generator test equipment is coupled directly to the television receiver to be tested and, when both units are turned on, a pattern of dots will appear on the television receiver picture tube screen. With the use of such test equipment and by the adjustment of controls within the chassis of the television receiver, as well as with the adjustment of the picture tube's peripheral magnets, desired convergence of the electron streams from the three guns of the tube upon various areas of the tube screen may be obtained.

In the past, television receiver dot generator test units as have been designed were extremely cumbersome units, unsuited to portability as is required by service crews. Additionally, such test units as have been heretofore designed have involved rather expensive circuitry for producing the desired test signal or signals. Furthermore, such units have employed a "cross-hatching" technique for producing large dots of square configurations. Such a dot pattern has been found by the inventor to be unnecessary and in many instances, in fact, undesirable, especially for initial alignment by the manufacturer's test crews. It would be highly desirable in many instances to achieve on the picture tube screen of the receiver being tested a pattern of extremely small dots, thereby enhancing the resolution of the receiver display and increasing the degree of convergence of the three-gun electron streams.

Moreover, it would be desirable additionally if the dot generator might be designed to utilize a minimum number of translating stages and component parts, so as to reduce chassis size to a minimum while at the same time maintaining optimum performance.

Therefore, it is an object of the present invention to provide a new and useful dot generator employable as test equipment for testing color television receivers.

It is a further object of the present invention to provide a new and useful dot generator which will exhibit an optimum degree of portability while at the same time exhibiting a highly satisfactory output test signal or signals.

It is an additional object of the present invention to provide a new and useful color television receiver dot generator for test equipment services, which generator will generate a test signal or group of signals effective to produce a desired dot pattern on the picture tube screen of the television receiver being tested, with the dots themselves being quite small in circumference.

According to the present invention, a dot generator test unit employs as few as six translating devices such as vacuum tubes (not including the power supply) and derives from the same the requisite horizontal sync pulses, the vertical sync pulses, dot burst pulses, and special pulses which are necessary components of the composite test signal desired. The dot pattern achieved may be varied both in the number of dots in the horizontal scan and also in the number of utilizable scans per frame. Both the horizontal and also the vertical sync pulses are obtained with a minimum number of components; additionally, the system inherently accomplishes complete self-synchronization. The unit may provide two simultaneous output signals for respective application either to the video portion of the television receiver being tested or to the R. F. antenna input of the receiver.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
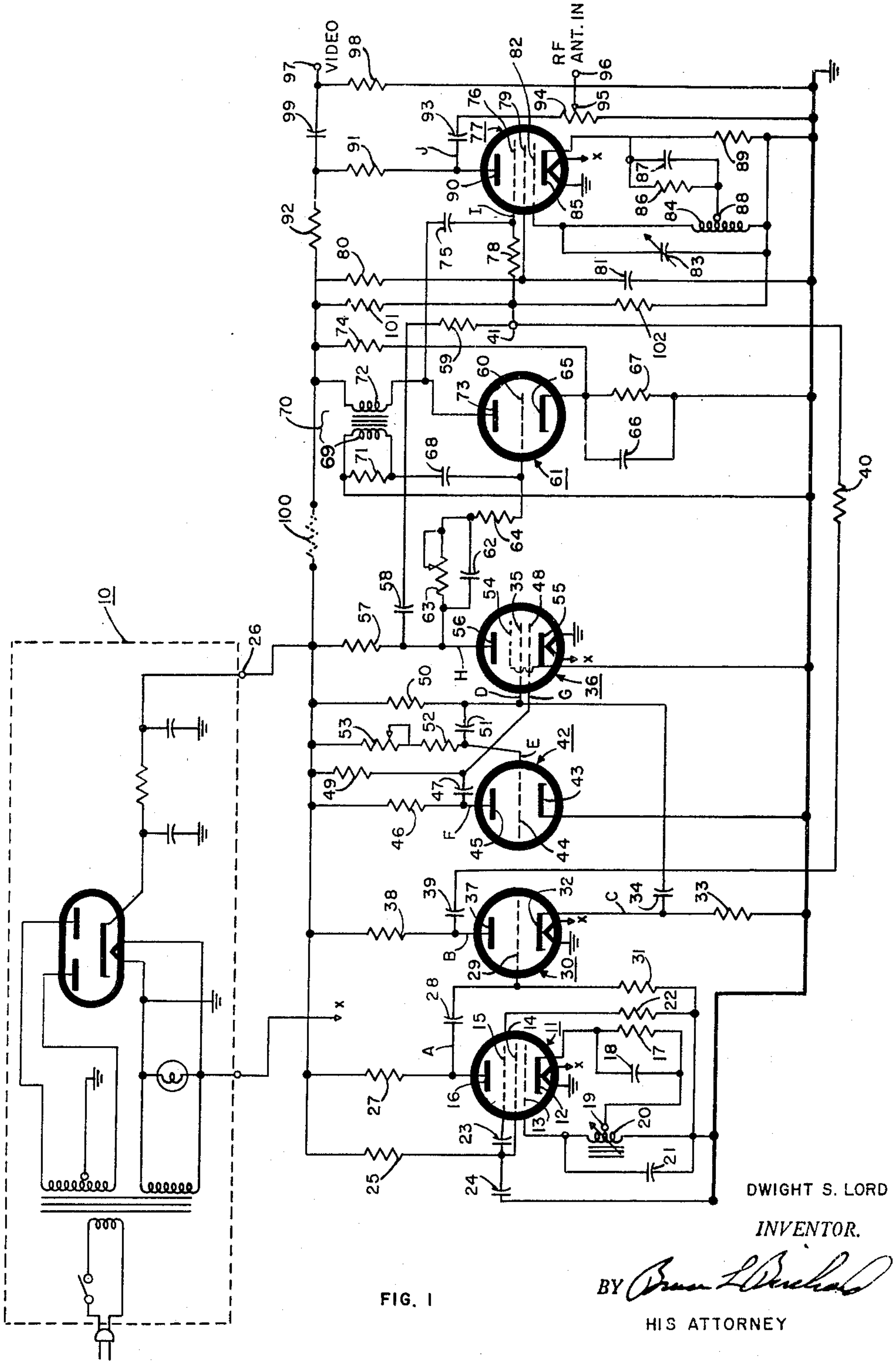
Figure 1 is a schematic diagram of a dot generator test unit as contemplated by the present invention.

In Figure 1, stage 10 is a conventional power supply incorporating a power transformer, a full wave rectifier, and a pi-type filter. This power supply may be designed to deliver a B+ voltage of about 250 volts and an A. C. filament voltage of about 6.3 volts. Translating device 11 includes cathode 12, control electrode 13, screen electrode 14, suppressor electrode 15, and anode 16. Cathode 12 is coupled through the parallel combination of resistor 17 and capacitor 18 to tap 19 disposed upon inductor 20. Inductor 20 is shunted by capacitor 21, and this combination is coupled between ground and control electrode 13. Suppressor electrode 15 is coupled through resistor 22 to ground and also through series-coupled capacitors 23 and 24 to ground. Screen electrode 14 is coupled to the junction of capacitors 23 and 24 and also through resistor 25 to B+ voltage terminal 26 of power supply 10. Anode 16 of translating device 11 is coupled through anode load resistor 27 to B+ voltage terminal 26. Anode 16 is also coupled through coupling capacitor 28 to control electrode 29 of translating device 30 and to ground through input resistor 31. Cathode 32 is coupled through cathode load resistor 33 to ground and also through coupling capacitor 34 to screen electrode 35 of translating device 36. Anode 37 of translating device 30 is coupled through anode load resistor 38 to B+ voltage terminal 26 and also through the series combination of coupling capacitor 39 and isolating resistor 40 to junction terminal 41. Translating device 42 is provided with cathode 43, control electrode 44, and anode 45. Cathode 43 is maintained at ground potential. Anode 45 is coupled through anode load resistor 46 to B+, and also through coupling capacitor 47 to control electrode 48 of translating device 36. Control electrode 48 is also coupled through resistor 49 to B+ voltage terminal 26 of power supply 10. Screen electrode 35 of translating device 36 is coupled to B+ through resistor 50 and also through the series combination of capacitor 51, resistor 52, and rheostat 53. The junction of capacitor 51 and resistor 52 is directly coupled to control electrode 44 of translating device 42. Suppressor electrode 54 of translating device 36 is connected directly to cathode 55, which itself is maintained at ground potential. Anode 56 of translating device 36 is coupled through anode load resistor 57 to B+ and also through coupling capacitor 58 and isolating resistor 59 to junction terminal 41. Anode 56 of translating device 36 is additionally coupled to control electrode 60 of translating device 61 through the parallel combination of integrating or squaring-off capacitor 62 and rheostat 63 which is connected in series with resistor 64. Cathode 65 of translating device 61 is coupled to ground through the parallel combination of capacitor 66 and resistor 67. Control electrode 60 of translating device 61 is additionally coupled to ground through the series-combination of charging capacitor 68 and secondary winding 69 of transformer 70 (which secondary winding is shunted by resistor 71). The primary winding 72 of transformer 70 is coupled between anode 73 of translating device 61 and B+ voltage terminal 26 of power supply 10. Cathode 65 of translating device 61 is additionally coupled to B+ voltage terminal 26 through voltage dropping resistor 74. Anode 73 of translating device 61 is coupled through coupling capacitor 75 to suppressor electrode 76 of translating device 77, which itself is coupled through isolating resistor 78 to junction terminal 41. Screen electrode 79 of translating device 77 is coupled through screen dropping resistor 80 to B+ and also through screen bypass capacitor 81 to ground. Control electrode 82 of translating device 77 is coupled to ground through the parallel combination of capacitor 83 and inductor 84. Cathode 85 of translating device 77 is coupled through the parallel combination of resistor 86 and capacitor 87 to inductance tap 88. Cathode 85 is also coupled through resistor 89 to ground. Anode 90 of translating device 77 is coupled through anode load resistor 91 and through resistor 92 to B+. Anode 90 is also coupled through coupling capacitor 93 and potentiometer 94 to ground. Movable tap 95 associated with potentiometer 94 is directly coupled to R. F. output terminal 96. Video output terminal 97 is coupled through resistor 98 to ground and also through coupling capacitor 99 to the junction of resistors 91 and 92. An additional resistor 100, shown in dotted configuration, may well be required as a decoupling device for the circuit and, as shown, it is disposed between the anode circuit of translating devices 36 and 61.

Figure 2:
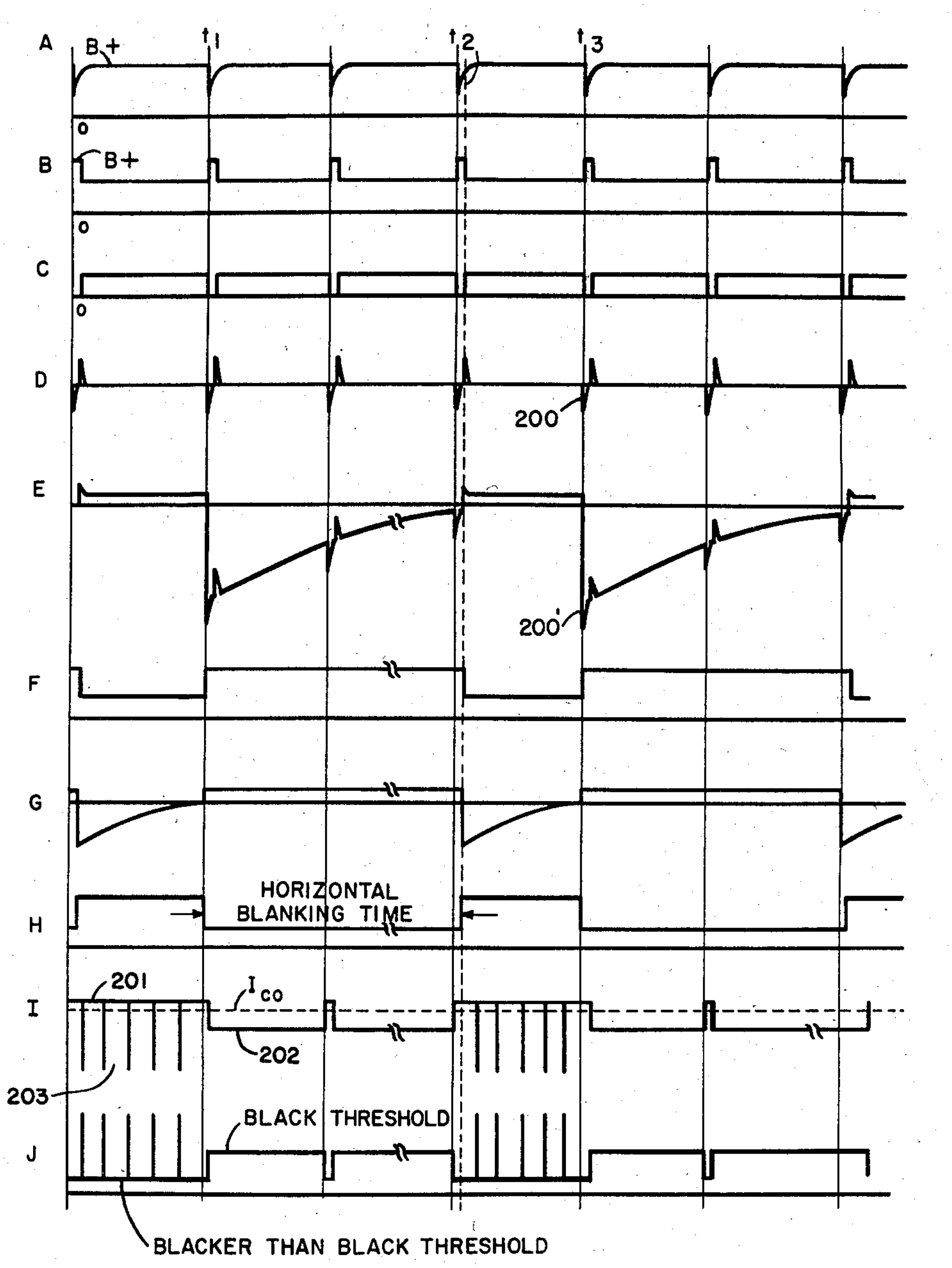
Figure 2 is a diagrammatic presentation of various wave forms as will exist at various points in the schematic diagram of Figure 1 when the test unit is in operation.

In Figure 2 are shown several of the wave forms which will be present at various points of the circuit of Figure 1 when the circuit is in its operative condition. The wave forms of Figure 2 shall be discussed concurrently with the operation of the circuit of Figure 1.

The circuit of Figure 1 operates as follows: The stage including translating device 11 resembles a conventional Hartley oscillator, and in many particulars operates as such. The combination of resistor 17 and capacitor 18 constitutes the conventional R. C. cathode bias combination. Inductor 20 and capacitor 21 compose a parallel resonant circuit, the parallel resonant frequency of which is, for example, 15,750 cycles. This frequency is of course the pulse repetition rate of horizontal sync pulses of the conventional television signal. It is to be noted that the signals exhibited by the parallel resonant circuit including inductor 20 and capacitor 21 will have a sine wave character whereas what will be desired from the output of the stage including translating device 11 will be a square wave signal, or at least a signal which may be simply converted into a square wave, so that the desired horizontal sync pulses may easily be attained. Now for positive swings of the voltage in the parallel resonant circuit in the input side of translating device 11, screen electrode 14 will conduct rather heavily so as to reduce the screen voltage, by virtue of the voltage drop across screen resistor 25, and also imposes a negative pulse upon suppressor electrode 15 by reason of the R. C. combination of resistor 22 and capacitor 23. Because of this action, and also by virtue of the fact that the chosen resistive values of the screen and anode load resistors are such as to reduce anode current drawn in comparison to screen current, anode 16 will draw a minimal amount of current during this interval. However, during negative swings of the voltage in the parallel resonant circuit including inductor 20 and capacitor 21, the screen current will be reduced and hence the voltage appearing at screen electrode 14 will rise abruptly, thus causing a positive pulse to appear at suppressor electrode 15, again by virtue of the inclusion of resistor 22 and capacitor 23. Hence, it is seen that, during this interval of time, positive pulses will "open" both the screen and suppressor electrodes so as to allow for a large surge of anode current. Time constants in the anode circuit are chosen so that this anode current surge will be comparatively high in magnitude and will last over a time interval roughly equal to the desired pulse width of the horizontal sync pulses to be produced. These large negative pulses appearing at point A in the anode circuit of translating device 11 will not be of a square wave character, however, but may easily be converted into square waves by means of the following stage including translating device 30. Before considering the action of the following stage it may be well to mention briefly that combination resistor 25 and bypass capacitor 24 serve to stabilize screen potential for all voltage fluctuation tendencies other than those inherent in the phenomena above described. Also, while critical adjustment of the resonant circuit including inductor 20 and capacitor 21 may be accomplished by the permeability tuning of the inductor, other methods of tuning the resonant circuit such as the inclusion of trimmer and padder capacitors might reasonably be employed.

It is seen from the schematic diagram of Figure 1 that the oscillator stage including translating device 11 is coupled by means of coupling capacitor 28 and input resistor 31, to a phase inverter stage including translating device 30. This stage is purely conventional, but with the value of anode resistor 38 being chosen to be roughly four times that of resistor 33 in the cathode circuit of the phase inverter. These resistive values are chosen so as to provide rather high level, square wave, sync pulses to junction terminal 41 and rather low level, negative, square wave pulses to the input of translating device 36, the operation of which shall be hereinafter explained. The phase inverter stage including translating device 30 will be well capable of squaring off the input wave form so as to achieve an output anode wave form at point B in the circuit and also an output cathode wave form at point C in the circuit as shown in Figure 2. As is seen in Figure 2, the output signal taken from anode 37 of translating device 30 is a train of positive, square wave pulses having a desired pulse width and also a pulse repetition rate of 13,750 cycles, equalling of course the resonant frequency of the parallel resonant circuit in the oscillator stage. The pulse train taken from cathode 32 of translating device 30 will be of negative polarity but of equal pulse width and pulse repetition frequency.

The purposes of discussion shall be best served by considering the processing of the signal at point C taken from cathode 32 of the phase inverter stage. This signal is fed through capacitor 34 to screen electrode 35 of the translating device 36. Coupling capacitor 34 and resistor 50 serve as a differentiating circuit, the action of which is relatively unaffected by the series combination of capacitor 51, resistor 52, and rheostat 53. The differentiated wave form at point D (which appears at screen electrode 35) is shown and described at D in Figure 2. Assume that at time $t_1$ translating device 42 is nonconductive, that is, that capacitor 51 is discharging through a resistor 52 and rheostat 53 in such a manner as to bias off translating device 42. Now the differentiated wave form at point D will be superimposed upon the discharge voltage curve so that the voltage wave form appearing at point E at control electrode 44 of translating device 42 will appear substantially as shown at E, as shown in Figure 2 (beginning at time $t_1$). The time duration of the biasing off of translating device 42 may be controlled of course by adjusting rheostat 53, as desired. The rheostat 53 adjustment is for controlling the spacing between successive lines of dots as generated on a screen of the television receiver to be tested. Thus, by reason of the adjustability of the discharge time of capacitor 51, the discharge voltage rise curve at E in Figure 2 is shown in broken line configuration. As is seen at E in Figure 2, it will be the trailing edge of a selected pulse of the pulse train at C in the phase inverter stage which will determine the succeeding conductive state of translating device 42. This results by virtue of the fact that only the trailing edges of the wave forms C will produce the differentiated wave positive pulses at E in Figure 2, which positive pulses will operate to trigger translating device 42 into conduction. Let us assume that conduction of translating device 42 is achieved at time $t_2$. During the interval between time $t_1$ and $t_2$, the anode voltage at F will be at the B+ level, owing to the non-conduction of translating device 42. Upon the conduction of translating device 42, the negative pulse resulting therefrom at anode 45 of translating device 42 will charge capacitor 47 through resistors 46 and 49 so as to lower the voltage supplied to control electrode 48 of translating device 36. This causes a reduction of anode current of translating device 36 so as to increase the voltage supplied to control electrode 44 of translating device 42. This action is cumulative so that translating device 42 achieves full conduction almost instantly, whereas translating device 36 will be cut off. This is illustrated in Figure 2 at points E, F, G, and H between times $t_2$ and $t_3$. It is to be noted that between times $t_2$ and $t_3$ translating device 42 will be fully conductive and translating device 36 will be completely nonconductive. The time constant of the combination of capacitor 47 and resistor 49 will be such that the control electrode of translating device 36 will almost approach the tube conduction level at the time of occurrence of the next succeeding sync pulse. Then, at this time, the occurrence of differentiated negative pulse 200, achieved from the leading edge of the next succeeding sync pulse, will appear at control electrode 44 of translating device 42 and will be amplified by the gain of the tube so as to force translating device 36 abruptly into conduction, and at the same time force translating device 42 into nonconduction by virtue of the cumulative multi-vibrator action. It is thus noted that the free-running multivibrator including translating devices 36 and 42 is synchronized for both the conductive condition and nonconducitve condition of each translating device. While screen electrode 35 of translating device 36 serves as the effective anode for the cumulative multi-vibrator action, yet the output signal will still be taken from anode 56. The signal wave form at H at anode 56 will be substantially that shown at H in the graphs of Figure 2. It is to be noted that the multi-vibrator including the input differentiator circuit provides output positive square wave pulses, the pulse width of which is defined by the time interval between successive horizontal sync pulses (at B or C) and that the spacing between positive pulses at H embraces the time interval as delineated by the horizontal sync pulses at the extremities of the horizontal line blanking time chosen (by the setting of rheostat 53).

The stage including translating device 61 resembles the conventional blocking oscillator. The recovery time of transformer 70 in the anode circuit of translating device 61 is chosen to be low purposely so that the output of blocking oscillator pulses will be as sharp as possible.

Considerable novelty is believed to be present in the operation of the blocking oscillator in the B+ return of the control electrode circuit of the blocking oscillator during non-conduction of translating device 36 of multivibrator stage. It is to be noted that the blocking oscillator functions only during intervals of non-conduction of translating device 36. This is accomplished as follows. Consider that at the outset translating device 36 is in a conductive state. At this point in time, the relatively high anode resistance of translating device 36 will reduce the operating potential at anode 56 to approximately 40 volts, for example. Thus, 40 volts will be applied effectively to control electrode 60 of translating device 61. It is to be noted, however, that resistors 74 and 67 combine to form a voltage divider network so as to maintain an operating voltage of plus 45 volts, for example, at cathode 65 of translating device 61, and this neglecting the cathode bias voltage generation of resistor 67 and capacitor 66. Thus, for intervals of conduction of translating device 36 in the multi-vibrator stage, control electrode 60 of the blocking oscillator translating device will be substantially 5 volts below the potential of cathode 65. Hence, translating device 61 will be effectively cut off and no blocking oscillator action will transpire. Now consider that translating device 36 of the multi-vibrator suddenly achieves its nonconductive state. In such event, the voltage at anode 56 of translating device 36 returns to B+ potential and, accordingly, capacitor 68 discharges its negative 5-volt potential and recharges in the B+ direction, thus throwing the blocking oscillator stage into operation. The charging path of capacitor 68 which includes resistor 64 and rheostat 63 may be selectively chosen so as to regulate not only the distance between the start of the horizontal trace of a chosen line (for the television receiver to be tested) and the first dot to appear upon the screen thereon, but also the horizontal time interval between successive dots. The negative blocking oscillator pulses are taken from anode 73 of translating device 61 and are fed by coupling capacitor 75 to suppressor electrode 76 of translating device 77 of the last stage. Resistor 78 is merely a decoupling resistor and is interposed between suppressor electrode 76 of translating device 77 and junction terminal 41.

Thus, we have combining at suppressor electrode 76 of translating device 77 three wave forms: the horizontal sync pulses of positive polarity coupled through capacitor 39 and resistor 40 from point B in the anode circuit of the phase inverter stage, the multi-vibrator wave form taken from anode 56 of translating device 36 and fed therefrom through coupling capacitor 58 and resistor 59, and also the negative polarity blocking oscillator pulses which, by virtue of the action above described are nonexistent during the troughs of the multi-vibrator wave form at point H in the anode circuit of translating device 36 during the time intervals of $t_1$–$t_2$. These various wave forms combine at I in the input circuit of translating device 77 as is shown at point I in Figure 2 of the wave forms. Resistors 101 and 102 form a voltage divider circuit for keeping suppressor electrode 76 of translating device 77 at an appropriate positive operating potential. Resistive values may be chosen so that the horizontal sync pulses which combine at I with the extremities of the positive square waves from the multi-vibrator may be of equal amplitude with the positive square wave's amplitude. The combination of the horizontal sync pulses associated with the positive multi-vibrator wave forms constitute in fact the vertical sync pulses for the television receiver system to be tested, with the television receiver operating as a count-down device. Translating device 77 may comprise a conventional, remote cut-off pentode so that full conduction is achieved for amplitude level 201 at I in Figure 2, 75% of full conduction is achieved by the amplitude level 202 at I in Figure 2, and at least partial conduction is achieved for majority of amplitude levels such as levels 203 of the blocking oscillator pulses.

A 180° phase inversion of the input signal of course takes place upon translation through the translating device 77 so that the signal at I will appear in its inverted form at J in the anode circuit of translating device 77. The "black" and "blacker-than-black" amplitude levels are shown in the diagram at point J in Figure 2. The fewer the number of horizontal sync pulses between successive series of blocking oscillator pulses, the more horizontal lines of course will be utilized for the dot display on the television receiver screen. The stage including translating device 77 in reality comprises a Hartley oscillator which is suppressor modulated by the described television test signal at I. Capacitor 83 may be adjusted to tune successive channels as desired. The signal appearing at R.-F. output terminal 96 will be the television signal above described at point J in Figure 2 superimposed upon the R.-F. carrier generated by the parallel resonant circuit including capacitor 83 and inductor 84. The R.-F. terminal 96 will of course be directly connected to the antenna input terminal of the television receiver to be tested. A video signal may be obtained at video terminal 97 which is free of the R.-F. carrier by virtue of resistor 92 and the inclusion of integrating capacitor 99 in the anode circuit of translating device 77.

Thus, the dot generator test unit above-described is believed to exhibit a maximum degree of compactness while at the same time generating an optimum test signal.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination, first means for generating first and second oppositely phased trains of pulses of a first pulse width and a first pulse separation; second means coupled to said first means and responsive to said first pulse train for generating a third train of pulses having a second pulse width, equal to and coincident with regular ones of said first pulse separations, and a second pulse separation; third means coupled to said second means and responsive to signals therefrom for generating regularly recurrent, equivalent, pulse pluralities each being coincident with successive pulses of said third pulse train; and fourth means coupled directly to each of said first, second, and third means for combining said second pulse train generated by said first means with the output signals of said second and third means to produce a utilizable composite output signal.

2. Apparatus according to claim 1 in which said first means includes an oscillator and a phase inverter coupled to said oscillator, said oscillator including a translating device having a parallel resonant input circuit, an output circuit, and first and second intermediate electrodes, a first resistor coupled between a source of positive potential and said first intermediate electrode, a second resistor coupled between a common reference potential and said second intermediate electrode, and a capacitor intercoupling said first and second intermediate electrodes.

3. Apparatus according to claim 1 in which said first means includes an oscillator and a phase inverter coupled to said oscillator, said oscillator including a translating device having a parallel resonant input circuit, an output circuit, and first and second intermediate electrodes, a first resistor coupled between a source of positive potential and said first intermediate electrode, a first capacitor and a second resistor coupled between a common reference potential and said first and second intermediate electrodes, respectively, and a second capacitor intercoupling said first and second intermediate electrodes.

4. In combination, first means for generating first and second oppositely phased trains of pulses of a first pulse width and a first pulse separation, said pulses of said first train being of negative polarity and said pulses of said second train being of positive polarity; second means coupled to said first means and responsive to said first pulse train for generating a third train of pulses of positive polarity having a second pulse width, equal to and coincident with regular ones of said first pulse separations, and a second pulse separation; third means coupled to said second means and responsive to signals therefrom for generating regularly recurrent, equivalent, negative pulse pluralities each being coincident with successive pulses of said third pulse train; and fourth means coupled directly to each of said first, second, and third means for combining said second pulse train generated by said first means with the output signals of said second and third means to produce a utilizable composite output signal.

5. Apparatus according to claim 4 in which said second means comprises a multi-vibrator stage having a differentiating input circuit and an output load resistor, and in which said third means comprises a blocking oscillator including a translating device having a control electrode and a discharge path intercoupling said control electrode with said output load resistor of said multi-vibrator.

6. Apparatus according to claim 5 in which said fourth means comprises a radio-frequency oscillator stage including a modulating input circuit coupled to said respective outputs of said first, second and third means.

7. Apparatus according to claim 6 in which said discharge path intercoupling said control electrode of said blocking oscillator and said load resistor of said multivibrator is variable.

8. Apparatus according to claim 6 in which said multivibrator includes an R–C discharge path exhibiting an adjustable time constant so as to provide for the regulation of the time intervals between successive output pulses from said multi-vibrator.

9. A pulse oscillator including, in combination, a vacuum tube having anode, cathode, control, screen, and suppressor electrodes, a parallel resonant circuit coupled between said control electrode of said vacuum tube and a common reference potential, said parallel resonant circuit including an inductor having an inductive tap, cathode bias means coupled between said cathode of said vacuum tube and said inductive tap of said parallel resonant circuit, screen and anode load resistors coupled between said screen electrode and said anode electrode, respectively, of said vacuum tube to a source of positive potential, a suppressor resistor coupled between said suppressor electrode of said vacuum tube and said common reference potential, a first capacitor intercoupling said screen and suppressor electrodes of said vacuum tube, and a second capacitor coupled between said screen electrode of said vacuum tube and said common reference potential.

10. A pulse oscillator including, in combination, a vacuum tube having an oscillatory input circuit, an output circuit, and first and second intermediate electrodes, a first resistor coupled between said first intermediate electrode and a source of positive potential, a first capacitor coupled between said first intermediate electrode and a common reference potential, a second capacitor intercoupling said first and second intermediate electrodes, and a second resistor coupled between said second intermediate electrode and said common reference potential.

11. In combination, a negative pulse source, a differentiating circuit coupled to said negative pulse source, a multi-vibrator coupled to said differentiating circuit, said multi-vibrator comprising first and second vacuum tubes, said first vacuum tube having anode, cathode, and control electrodes, said second vacuum tube having at least anode, cathode, control, and screen electrodes, a first capacitor intercoupling said control electrode of said first vacuum tube with said screen electrode of said second vacuum tube, a second capacitor coupled between said anode of said first vacuum tube and said control electrode of said second vacuum tube, a first and variable resistor coupled between said control electrode of said first vacuum tube and a source of positive potential, a second resistor coupled between said control electrode of said second vacuum tube and said source of positive potential, a third resistor coupled between said anode of said first vacuum tube and said source of positive potential, a fourth resistor coupled between said screen electrode and said source of positive potential, said cathodes being coupled to a common reference potential, said negative pulse source being coupled through said differentiating circuit to said screen electrode of said second vacuum tube, and an output anode load resistor coupled between said anode of said second vacuum tube and said source of positive potential.

12. The apparatus as defined in claim 11, and in combination therewtih, a blocking oscillator having a control electrode, and a resistive, discharge circuit coupling said control electrode of said blocking oscillator to said anode electrode of said second vacuum tube of said multi-vibrator.

13. The apparatus as defined in claim 11, and in combination therewith, a blocking oscillator having a control electrode, and a variably resistive discharge circuit coupling said control electrode of said blocking oscillator to said anode electrode of said second vacuum tube of said multi-vibrator.

14. A blocking oscillator including a vacuum tube having anode, cathode, and control electrodes, cathode bias means coupled between said cathode of said vacuum tube and a common reference potential, a transformer having primary and secondary windings, said primary winding being coupled between said anode of said vacuum tube and a source of positive potential, a first capacitor coupled to a common reference potential through said secondary winding and also to said control electrode of said vacuum tube, and a resistive circuit path coupled to said control electrode of said vacuum tube; and in combination therewith, the apparatus as defined in claim 11 with said anode of said second vacuum tube being coupled to said resistive path.

15. Apparatus according to claim 14 in which separate means is provided to maintain said cathode of said blocking oscillator at a positive reference potential even in the absence of cathode current.

16. Apparatus according to claim 14 in which said resistive circuit path includes an integrating capacitor.

References Cited in the file of this patent

UNITED STATES PATENTS

| | | |
|---|---|---|
| 2,391,386 | Bradley | Dec. 25, 1945 |
| 2,492,767 | Reynolds | Dec. 27, 1949 |
| 2,537,077 | McVay et al. | Jan. 9, 1951 |
| 2,539,826 | George | Jan. 30, 1951 |
| 2,556,027 | Carson | June 5, 1951 |
| 2,573,742 | Toth | Nov. 6, 1951 |
| 2,733,339 | Imm | Jan. 31, 1956 |

OTHER REFERENCES

Page 180, Fig. 5.26 of volume 19, "Waveforms," of the "Radiation Laboratory Series," by Chance et al.; McGraw-Hill Book Co. New York, N. Y.